US009771033B2

(12) United States Patent
Oxenfarth et al.

(10) Patent No.: US 9,771,033 B2
(45) Date of Patent: Sep. 26, 2017

(54) METHOD FOR RINSING/FLUSHING A TOILET OF A VEHICLE AND TOILET

(71) Applicant: Dometic GmbH, Siegen (DE)

(72) Inventors: Jens Oxenfarth, Ennepetal (DE); Tim Jochim, Wilnsdorf (DE); Volker Müller, Hilchenbach (DE)

(73) Assignee: Dometic GmbH, Siegen (DE)

( * ) Notice: Subject to any disclaimer, the term of this patent is extended or adjusted under 35 U.S.C. 154(b) by 221 days.

(21) Appl. No.: 14/466,486

(22) Filed: Aug. 22, 2014

(65) Prior Publication Data

US 2015/0059075 A1    Mar. 5, 2015

(30) Foreign Application Priority Data

Aug. 29, 2013 (EP) .................................... 13182275

(51) Int. Cl.
 B60R 15/04     (2006.01)
 E03D 5/10      (2006.01)
 E03D 1/01      (2006.01)
(52) U.S. Cl.
 CPC ............... B60R 15/04 (2013.01); E03D 1/01 (2013.01); E03D 5/10 (2013.01)
(58) Field of Classification Search
 CPC .................................................... B60R 15/04
 See application file for complete search history.

(56) References Cited

U.S. PATENT DOCUMENTS

| 1,067,096 | A |   | 7/1913  | Cochran          |           |
|-----------|---|---|---------|------------------|-----------|
| 3,570,018 | A |   | 3/1971  | Sargent et al.   |           |
| 3,611,446 | A | * | 10/1971 | Howard           | E03D 5/00 |
|           |   |   |         |                  | 4/315     |
| 3,801,991 | A |   | 4/1974  | Fulton et al.    |           |
| 3,938,201 | A |   | 2/1976  | McGrew           |           |
| 4,091,475 | A |   | 5/1978  | Hewson et al.    |           |
| 4,173,800 | A |   | 11/1979 | Flegel et al.    |           |
| 4,439,875 | A |   | 4/1984  | Stewart et al.   |           |
| 4,578,831 | A |   | 4/1986  | Mellinger et al. |           |
| 4,734,943 | A |   | 4/1988  | Mellinger et al. |           |
| 4,864,664 | A |   | 9/1989  | Higgins          |           |
| 4,987,616 | A |   | 1/1991  | Ament            |           |

(Continued)

FOREIGN PATENT DOCUMENTS

| AU | 20120227236 | 9/2012 |
|----|-------------|--------|
| DE | 4116486     | 1/1993 |

(Continued)

OTHER PUBLICATIONS

IP Australia; Patent Examination Report No. 1 for Application No. 2012227236 Apr. 9, 2014.
Transmittal Letter of Related Cases Jan. 24, 2017.

Primary Examiner — Janie Loeppke
(74) Attorney, Agent, or Firm — Middleton Reutlinger

(57) ABSTRACT

The inventive embodiments concern a method for flushing a toilet for vehicles, especially for motor homes, buses, recreational vehicles, or watercraft, with a toilet bowl, a control unit for actuating a flushing with a control program, and with a conduit piece for drainage of the waste water from the toilet bowl into a waste-holding tank and a toilet system for implementing the method and a vehicle with the toilet system according to the inventive embodiments.

10 Claims, 6 Drawing Sheets

(56) References Cited

U.S. PATENT DOCUMENTS

| | | | |
|---|---|---|---|
| 5,031,249 A * | 7/1991 | Sargent | B60R 15/04 4/321 |
| 5,063,616 A | 11/1991 | Bresnahan | |
| 5,067,181 A | 11/1991 | Hafner et al. | |
| 5,204,999 A | 4/1993 | Makita et al. | |
| 5,341,521 A | 8/1994 | Redford | |
| 5,355,537 A | 10/1994 | Redford | |
| 5,446,928 A | 9/1995 | Daniels | |
| 5,502,845 A | 4/1996 | Hayashi et al. | |
| 5,887,294 A | 3/1999 | Yeung | |
| 5,918,325 A | 7/1999 | Arita et al. | |
| 6,189,161 B1 | 2/2001 | Rijn et al. | |
| 6,367,095 B2 | 4/2002 | Hubatka et al. | |
| 6,421,843 B1 | 7/2002 | Mellinger et al. | |
| 6,470,505 B1 | 10/2002 | Boisvert | |
| 6,668,391 B1 | 12/2003 | Lee et al. | |
| 6,944,891 B2 | 9/2005 | Kuru et al. | |
| 7,004,508 B1 | 2/2006 | Flynn et al. | |
| 7,293,298 B2 | 11/2007 | Cameron et al. | |
| 7,305,721 B2 | 12/2007 | Matsui et al. | |
| 7,383,593 B2 | 6/2008 | Campbell | |
| 7,721,359 B2 | 5/2010 | Tsutsui et al. | |
| 8,230,531 B2 * | 7/2012 | Miller | E03D 5/10 4/319 |
| 2004/0068785 A1 | 4/2004 | Tomita et al. | |
| 2005/0015871 A1 | 1/2005 | Tomita et al. | |
| 2005/0166308 A1 | 8/2005 | Miwa et al. | |
| 2006/0200898 A1 | 9/2006 | Kuru et al. | |
| 2007/0113331 A1 | 5/2007 | Prokopendo et al. | |
| 2013/0081200 A1 | 4/2013 | Jochim et al. | |

FOREIGN PATENT DOCUMENTS

| | | |
|---|---|---|
| DE | 4415832 | 11/1995 |
| DE | 102004035853 | 2/2006 |
| DE | 202007002270 | 6/2007 |
| DE | 102011113813 | 3/2013 |
| EP | 0248460 | 2/1990 |
| EP | 2484560 | 8/2012 |
| EP | 2572940 | 9/2012 |
| EP | 2842811 | 10/2015 |
| EP | 2843142 | 6/2016 |
| FR | 2771432 | 5/1999 |
| JP | 04327617 | 11/1992 |
| WO | 9927203 | 6/1999 |
| WO | 9958777 | 11/1999 |
| WO | 0134918 | 5/2001 |
| WO | 03014483 | 2/2003 |
| WO | 2005033423 | 4/2005 |
| WO | 2008031083 | 3/2008 |

* cited by examiner

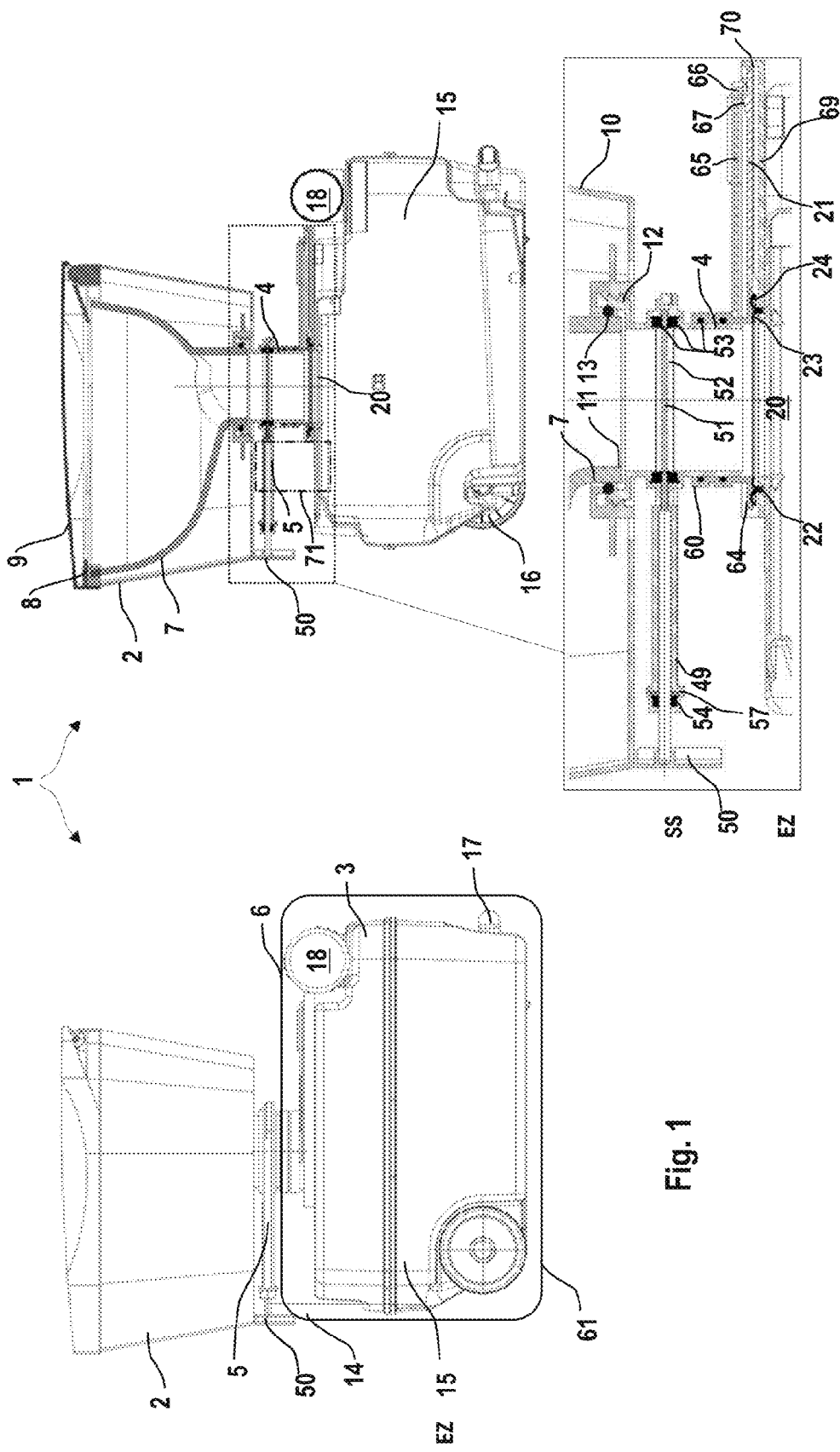

METHOD FOR RINSING/FLUSHING A TOILET OF A VEHICLE AND TOILET

CROSS REFERENCE TO PRIOR APPLICATION

This U.S. National Non-Provisional application claims benefit of 35 U.S.C. §119, and priority under 35 U.S.C. §365, to European Patent Application 13182275, filed on Aug. 29, 2013, which is currently pending and all of which is incorporated by reference herein.

BACKGROUND

Technical Field

The present embodiments concern a method for flushing a toilet of a vehicle, especially a toilet of a recreational vehicle, such as for motor homes, buses, but also for watercraft such as boats or yachts, with a toilet bowl, a conduit piece for drainage of waste water into a waste-holding tank, and a control unit for actuating a flushing with a control program. Moreover, the present embodiments concern a toilet system with a toilet bowl with a closable conduit piece and at least one control unit as well as a vehicle with such a toilet system and a computer program product to carry out the steps of the method of the embodiments.

Description of Related Art

Known toilets which find use in recreational vehicles consist of an upper part and a lower part. The upper part comprises a seat and a toilet bowl, while the waste-holding tank is located in the lower part and can be connected to the toilet bowl of the upper part. In particular, cassette toilets are known from the prior art for use in recreational vehicles, having a waste-holding tank which is easily removable from the toilet and thus simple to replace. Such toilets are known from EP 2 484 560 A1 and EP 2 572 940 A1. The waste-holding tank here is configured as a cassette and serves as a collecting tank for the waste water. The waste-holding tank can accept both liquids and solids. In the known cassette toilets, the toilet bowl can be permanently installed in a vehicle via a supporting part. The waste-holding tank is located under the toilet bowl in a cassette shaft. The cassette shaft is generally accessible from the outside via a flap in the outer wall of the vehicle. In this way, the waste-holding tank can be easily inserted into or pulled out from the cassette shaft.

The toilets known from the prior art work satisfactorily when the waste-holding tank is shoved into the cassette shaft. However, a major drawback occurs when the waste-holding tank is removed from the cassette shaft, for example, for emptying, cleaning, or servicing. If the toilet is used in this case, for example in an emergency situation or without knowledge or attention to the situation, the excrement or liquids drop through the outlet of the toilet bowl and the conduit piece into the cassette shaft or into the vehicle. This is highly undesirable and unhygienic and the resulting contamination makes necessary an expensive cleaning, at least of the cassette shaft. The consequences are all the more disastrous in such a situation if furthermore the waste-holding tank is inadvertently put back into the contaminated cassette shaft. Moreover, if liquid gets into hard to reach areas of the vehicle, this can become contaminated beyond repair or even damaged.

Moreover, there are a number of proposals for toilet flushing systems that can trigger a standard flushing by means of a control unit. In a so-called standard flushing, the flushing is generally triggered manually by a user via a suitable activating device and water of flushing liquid is introduced into the toilet bowl for the flushing. The contaminated flushing liquid is then taken away via the drain into the waste-holding tank.

The use of such toilet flushing systems is possible up to the maximum volume capacity of the waste-holding tank. Upon reaching the maximum volume capacity of the waste-holding tank, the tank can overflow in a further flushing operation, and the waste water will collect in the region above the inlet of the waste-holding tank between toilet bowl and waste-holding tank and then run into the cassette shaft or the inside of the vehicle. The result, when pulling out the waste-holding tank, is that the excess waste water will get into the cassette shaft or the vehicle in an uncontrolled manner. Such contamination must be prevented, for the above mentioned reasons.

Therefore, the problem of the inventive embodiments is to prevent the uncontrolled draining of waste water, especially flushing liquid or solids, into the empty cassette shaft or the vehicle.

Moreover, the problem is to propose a toilet system with a toilet flushing that also enables a hygienic use of the toilet, at least for emergencies, even when the waste-holding tank is removed from the cassette shaft, and which can find use in a vehicle of the above-described kind.

The information included in this Background section of the specification, including any references cited herein and any description or discussion thereof, is included for technical reference purposes only and is not to be regarded subject matter by which the scope of the instant embodiments are to be bound.

SUMMARY

The problem is solved with the method and a device according to the independent claims. Advantageous modifications are described in the dependent claims. Moreover, a computer program product is provided for carrying out the method of the inventive embodiments. The use of a toilet system according to the present embodiments in a vehicle is also described.

A method for flushing a toilet is provided according to the inventive embodiments, especially a toilet of a recreational vehicle. By recreational vehicle in the context of the present embodiments is meant motor homes, a touring bus, but also a watercraft, such as boats or yachts. The toilet has a toilet bowl, a control unit for actuating a flushing with a control program, and a conduit piece for conveying the waste water out from the toilet bowl into a waste-holding tank. According to the inventive embodiments, the following steps of the method are performed:

closing of the conduit piece by a conduit closure;
providing an emergency flush function by the control program; and,
performing of an emergency flush in the emergency flush function when a flush is triggered.

By means of a conduit closure, the preferably pipelike conduit can be switched from an open position for standard operation to a closed position in which the emergency flush function is provided. The conduit closure is preferably designed as a sliding lock, shutoff valve, gate flap or ball closure, wherein the conduit closure can be manually activated for opening or closing with a suitable handle. Alternatively, the conduit closure can also be electrically opened and closed.

In the closed position of the conduit closure, it prevents solids, liquids or other parts placed in the toilet bowl from leaving the conduit piece uncontrolled and getting into the cassette shaft, for example. In this way, contamination and damage is also avoided. By closing the conduit piece with the conduit closure, furthermore, the introducing of body parts or other objects into the conduit piece or the cassette shaft is prevented and thus concomitant injury or damage is prevented.

According to the inventive embodiments, the closing of the conduit closure and the resulting catchment area enables at least emergency use of the device, even if the waste-holding tank is removed. The inadvertent use of the toilet when the waste-holding tank has been removed also does not have the above-described negative consequences.

For this case, besides the mechanical parts, especially the conduit closure, at least one electronic component in the form of a programmable control unit to carry out an emergency flush function is provided. The programmed emergency flush ensures that waste such as paper, excrement, urine and the like which has collected above the conduit closure is covered or diluted by an emergency flush interval with flushing liquid dispensed in this way. For this, preferably a minimum duration of the emergency flush is set in the control program. In this way, fouling of the toilet and odors of the substances located on the conduit closure can be minimized and the later cleaning simplified.

By means of the combination of mechanical and electronic components, an emergency flushing can still be performed despite the waste-holding tank being removed or already totally full. In this way, the toilet can also be used in this situation, at least for one last time. Fecal matter together with liquids is captured in this way and diluted or covered by means of a predefined amount of flushing liquid, reducing the odor.

In this way, the hygienic situation can be improved for temporary storage, before the waste-holding tank is again inserted into the cassette shaft and is available for normal use of the toilet.

Advisedly, the emergency flush is automatically halted by a timer. This limits the volume of flushing liquid dispensed into the toilet bowl, depending on the maximum capacity of the toilet bowl.

The timing control by regulating the maximum allowable volume of flushing water prevents the toilet bowl from running over in the closed position of the conduit closure and contaminating the toilet room or bathroom area in the vehicle. The emergency flush is carried out according to a time interval set in the control unit or the control electronics. The maximum predetermined time will depend on the maximum capacity of the toilet bowl when the conduit closure is shut. To avoid a contamination of the flushing device such as flushing nozzle or openings due to excessive waste water in the toilet bowl, the time interval can be limited, for example, to 6 seconds. In this way, a squirting or spilling during travel motion of the vehicle can be avoided.

With the help of the timing control of the emergency flush function, hereinafter also called the auto stop function, in addition to the aforementioned benefits one can also avoid an improper use of the toilet flushing. An improper use can occur by malfunction, such as too much moisture or water droplets on a capacitive keypad, or by the user not noticing the outcome of the flushing and activating several flush processes in a row.

According to the inventive embodiments, therefore, the flushing is deactivated after performing an emergency flush. In this way, only one emergency flush is allowed. Any further emergency flushing or other kind of flushing is prevented, as long as the waste-holding tank with an adequate remaining capacity is not present in the cassette shaft. In particular, a standard flushing with larger flush volume than an emergency flush is also prevented, to avoid an overflowing of the toilet bowl.

Advisedly, the closing of the conduit closure is coupled to the removal of the waste-holding tank. A removal of the waste-holding tank from the cassette shaft is thus possible only after closing the conduit piece by moving the conduit closure from the open to the closed position. Furthermore, an opening of the conduit closure by moving the conduit closure from the closed to the open position is only possible after inserting the waste-holding tank in the cassette shaft. Thanks to this coupling, after moving the conduit closure to the closed position the waste-holding tank is automatically released for emptying. By the same token, in this embodiment of the toilet, after removal of the waste-holding tank the conduit closure is automatically locked in the closed position.

One preferred embodiment of the toilet has a locking mechanism with a closure bolt and a cassette bolt on the waste-holding tank. Advisedly, the locking mechanism has a closure dog which can be coupled to the conduit closure and a cassette dog which can be coupled to the waste-holding tank. Thanks to the coupling of the dogs to the corresponding parts, it is possible to directly transmit a displacement of one dog to the other one. Furthermore, by pulling out the waste-holding tank via the cassette dog and the closure dog, the closure bolt prevents the conduit closure from opening.

The coupling element between closure dog and cassette dog can be preferably in the form of a Bowden cable, a rod of a gearing, a servomotor, a linear or rotational guide, a cable pull, a chain drive or a lifting magnet. Essentially, an automation of the coupling process is also conceivable.

By activating the locking mechanism, the conduit closure will be locked in the closed position and at the same time it will be possible to pull out the waste-holding tank. The waste-holding tank can then be removed from the cassette shaft. As described, as soon as the cassette is removed from the cassette shaft the locking mechanism ensures that the conduit closure is locked in the closed position. Thus, in advantageous manner, liquids or solids cannot get uncontrolled into the cassette shaft when the waste-holding tank has been pulled out. This also ensures conditions for going to the toilet or at least one last use of the toilet with emergency flushing.

In one advantageous modification according to the present embodiments, the method furthermore has the following steps:

polling of at least one status variable in regard to the waste-holding tank, especially the position of the waste-holding tank, and/or in regard to the conduit closure, especially the position of the conduit closure;

providing of the emergency flush function by the control program in dependence on the at least one status variable; and, performing of the emergency flushing, a standard flushing, or no flushing in dependence on the at least one status variable.

On the basis of measurement results based on the ascertained status variables, a sensor-supported actuation of the emergency flushing can be provided with suitable sensors. Depending on the status variable or variables and sensor signals detected, the normal operation of the toilet with a standard flush volume or a onetime emergency flushing with relatively small flushing volume can be released. Optionally, a flushing can also be entirely prevented.

In another advantageous modification according to the embodiments, the method furthermore has the following steps:

detecting of the status variable "waste-holding tank position" by means of a sensor;

processing of the status variable "waste-holding tank position" by the control unit; and, releasing of an emergency flushing in dependence on the status variable "waste-holding tank position".

Thanks to the position polling, which is done by a sensor, especially a microswitch on the frame of the toilet, it can be detected whether a waste-holding tank is situated in the cassette shaft of the toilet. If the waste-holding tank was removed for emptying, cleaning, or replacement, the sensor or the microswitch relays the signal "waste-holding tank in the removed state" via a suitable communications interface of the electronics to the control unit. By the emergency flush function memorized in the control unit, the toilet can still be flushed one time and supplied with flushing liquid. This has the advantage of providing an emergency flushing for the use of the toilet or for one last trip to the toilet even if the waste-holding tank was removed from the cassette shaft.

Thus, with the method according to the instant embodiments, one last emergency flushing is permitted, whose predetermined quantity of flushing liquid enables a hygienically improved intermediate storage on the closed conduit closure and a following easy removal of the contents and the waste water from the toilet bowl and cleaning of the toilet bowl when the waste-holding tank is again inserted.

In another advantageous modification according to the present embodiments, the method furthermore has the following steps:

detecting of the status variable "fill level in the waste-holding tank" by means of a sensor;

processing of the status variable "fill level in the waste-holding tank" by the control unit; and, releasing of an emergency flushing in dependence on the status variable "fill level in the waste-holding tank".

By a fill level sensor in the waste-holding tank, the signal "waste-holding tank has reached maximum fill level" is sent to the control unit. The control unit is programmed so that it allows a last flush even though the waste-holding tank is full. In this way, one can go to the toilet one last time if the conduit piece was previously closed. Thus, with the help of a fill level measurement, an emergency flushing can be allowed when the waste-holding tank is completely full and still present in the cassette shaft. Thanks to the intermediate storage of an emergency flush volume above the previously closed conduit closure, an overflowing of the waste-holding tank into the cassette shaft or an unwanted blockage in the conduit piece is prevented.

The option of an emergency flushing even though the tank is already full is especially advantageous when the vehicle is on the road and the waste-holding tank cannot be emptied or cleaned. This is the case, for example, when there is no emptying or cleaning station in the vicinity of the motor home or vehicle. The fluid-tight conduit closure in this case prevents an uncontrolled drainage of the diluted bowl contents collecting on the conduit closure into the lower part of the conduit piece. Once an emptying station has been reached, the full waste-holding tank can be removed from the cassette shaft without contamination and emptied.

In another advantageous modification according to the embodiments, the method furthermore has the following steps:

detecting of the status variable "conduit closure position" by means of a sensor;

processing of the status variable "conduit closure position" by the control unit; and, releasing of an emergency flushing in dependence on the status variable "conduit closure position".

Thus it is assured that the closing of the conduit closure is done successfully. An incomplete closure occurs, for example, when objects are introduced inadvertently and prevent the closing. A sensor monitoring is furthermore advantageous when the conduit closure does not stay automatically in the closed position or can be mechanically locked. Thus, it can also monitor whether an unintentional opening of the conduit closure has occurred on the road from motions of the vehicle.

The polling of the closed position can advisedly be combined with other polling, especially that of the fill level. It is advantageous if the conduit closure is automatically moved to the closed position after detecting a full waste-holding tank. The successful closing is relayed to the control unit and thereupon the emergency flush function is released by the control unit. This can be actuated one time by the user.

The actuating of the flushing can be done by a user via a suitable activating device, such as a capacitive keypad. Alternatively, the flush actuation can be done with sensor support via the direct and/or indirect detection of a user. Suitable motion sensors such as those based on measuring infrared light or radar signal can be used to detect the presence of a user. Furthermore, the using of the toilet can also be detected indirectly by detecting changes in physical parameters such as temperature, pH value or the like. For example, a heat sensor can detect a temperature change due to urine and thus actuate an emergency flushing with a time delay. In addition, the successful performance of the emergency flushing can be checked by means of sensors to detect resistance, conductance, or fill level in the toilet bowl. For example, changes in fluid properties indicate a successful dilution of the waste water. Alternatively, a fill level sensor can be installed in the toilet bowl to check a predetermined minimum or maximum liquid level in the toilet bowl.

In another advantageous modification according to the embodiments, the method furthermore has the following steps:

inserting of the waste-holding tank after performing the emergency flushing;

opening of the conduit closure and releasing of the waste water into the waste-holding tank; and, performing of a standard flushing.

By inserting the waste-holding tank into the cassette shaft, the conduit closure is unlocked, preferably mechanically, and the conduit closure can be moved to the open position. Thus, the contents of the bowl can be drained into the waste-holding tank. After this, with the help of the control unit, a standard flushing is actuated, preferably automatically, in order to remove possible traces of the contents from the toilet bowl. The toilet can then be used as usual. After a reactivation of the normal flushing function by means of the control unit, a user can actuate one or more standard flushes as needed.

Furthermore, a toilet system for vehicles is provided according to the inventive embodiments. The toilet system has a toilet with a toilet bowl, a programmable control unit for actuating a flushing with a control program, a flushing valve for flushing the toilet bowl with flushing liquid and a conduit piece for drainage of the waste water from the toilet bowl into a waste-holding tank. The conduit piece can be closed by means of a conduit closure. When a flushing is activated, an emergency flushing by the control unit can be actuated.

The toilet bowl and the conduit piece are preferably configured as a single structural part. Alternatively, the conduit piece can be fastened easily and fluid-tight to the outlet of the toilet bowl, for example, by means of a threading and corresponding gaskets.

The method of the embodiments for emergency flushing of a toilet bowl can be implemented with the aid of the toilet system according to the embodiments. In this way, fecal matter or urine can be hygienically kept above the conduit closure together with a predetermined amount of flushing liquid until an emptied waste-holding tank is inserted to receive the bowl contents and the latter is drained into the waste-holding tank.

As a modification, the toilet system has at least one sensor for sensor-supported actuation of the emergency flushing, wherein the sensor is chosen from the group of position detector, fill level sensor, microswitch, and physical property sensor.

By means of sensors, measurement data regarding the waste-holding tank, the conduit closure, the fluid properties and/or level in the toilet bowl and changes in state by the user can be relayed to the control unit. Physical property sensors can measure changes in physical parameters such as radiation, heat or conductance and thus indicated when the toilet has been used. On the basis of the measurement data, the control unit can release an emergency flushing.

Moreover, it is advantageous for the control unit of the toilet system to comprise a storage unit to contain at least one flush program. In this way, a control electronics can save a plurality of control programs, which can be actuated as needed by the particular user or users or depending on the water supply. The control unit can be designed as a control electronics and as part of the onboard computer.

Advisedly, the control unit has an interface for programming and/or for communication with sensors. With the aid of an interface making possible an exchange of data and information, a programming can be done in easy fashion. For example, the interface can be a serial interface such as a USB interface (Universal Serial Bus interface). The communication with one or more sensors can advantageously be wireless.

Moreover, a computer program product is provided, which can be loaded into a storage unit of the control unit in order to perform individual or all steps of the above described method.

Moreover, the inventive embodiments concern a vehicle, especially motor home, bus, recreational vehicle or water craft, with a toilet system according to the embodiments.

BRIEF DESCRIPTION OF THE DRAWINGS

The inventive embodiments are explained more closely below with the aid of sample embodiments and method steps indicated in the figures. There are shown:

FIGS. 1 and 2, a schematic side view and cross sectional view with detail cutout of an embodiment of a toilet, wherein the conduit closure is shown in the closed position;

In the figures, the same reference numbers are used for similar parts of the different embodiments.

DETAILED DESCRIPTION

Figure 3:
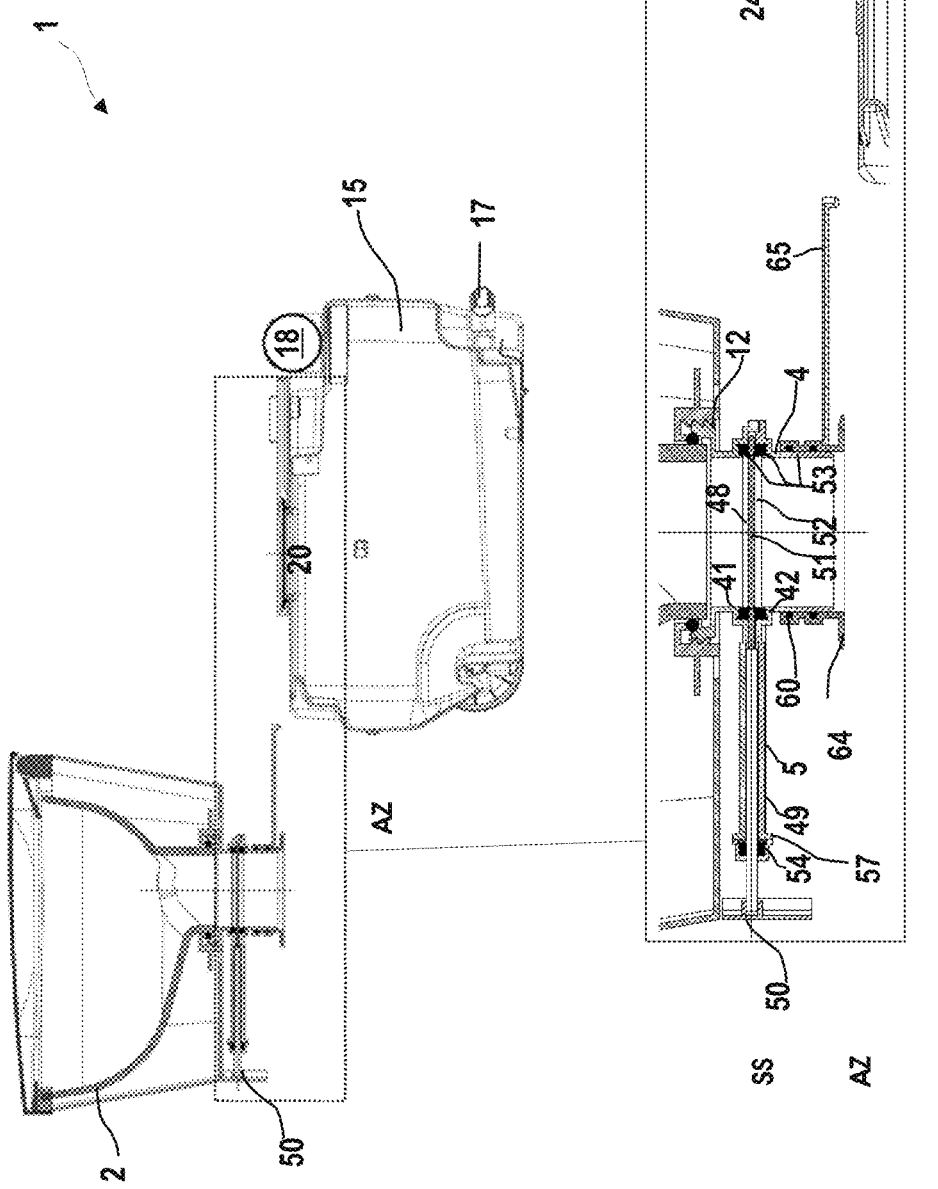
FIG. 3, the toilet of FIG. 1 after pulling out the waste-holding tank, wherein the conduit closure and the inlet of the waste-holding tank is shown in the closed position, enlarged.

FIGS. 1 to 7 show the method 100 according to the inventive embodiments of the toilet 1 according to the invention for vehicles, especially for buses, motor homes, recreational vehicles and water craft. The embodiments of the toilet 1 shown in FIGS. 1 to 6 have an upper part 2 and a lower part 3. The upper part 2 comprises a toilet bowl 7 with a swiveling toilet seat 8 and a toilet lid 9. The lower part 3 serves as a receptacle and for the fastening of the upper part 2. The lower part 3 can be fastened via the foot part 61 to a vehicle floor. Moreover, the lower part 3 has reinforcements and a carrier part 6 on the top side in order to support the upper part and the conduit piece 5 connected to it.

The lower part 3 contains a cassette shaft 14, in which the waste-holding tank 15 is located in the inserted position. The waste-holding tank 15, also known as a cassette, can receive both liquids and solids. The capacity of the waste-holding tank is usually not more than 40 liters, preferably around 20 liters. The inlet 20 of the waste-holding tank 15 is located underneath the toilet bowl outlet 11 and the lower part 42 of the conduit piece 4, in order to receive waste water drained from the toilet bowl 7. When used in mobile homes, the waste-holding tank 15 is generally accessible from the outside via a flap in the outer wall of the vehicle (not shown). With the aid of the handle 17, the waste-holding tank can be easily moved from the cassette shaft from an inserted state EZ (FIGS. 1 and 2) into the extracted state AZ (see FIG. 3). To facilitate the transport to a disposal station, the waste-holding tank 15 has a telescopic handle 17 and two wheels 16. Disposal can occur easily via a swiveling disposal nozzle 18.

The detailed cutout of FIG. 2 shows in particular the lower end of the toilet bowl 7 with the toilet bowl outlet 11 and the conduit piece 4. The conduit piece 4 comprises an upper conduit part 41 and a lower conduit part 42, the two being joined together in form fitting manner. The upper conduit part 41 has a thread 12 at one upper end for a connection to the toilet bowl outlet 11. By means of the thread 12, the upper part 2 is mounted in swiveling and height-adjustable manner. For a fluid-tight connection between the toilet bowl outlet 11 and the upper conduit part 41, an O-ring 13 is provided. Additional O-rings 53 are mounted between the cassette adapter 60 and the lower conduit part 42. By means of the cassette adapter 60, the waste-holding tank 15 in the inserted state EZ is connected fluid-tight to the conduit lower part 42 of the conduit piece 4. If the waste-holding tank 15 is inserted in the cassette shaft 14, the cassette seal 22 seals off the passage to the conduit piece 4.

Moreover, the conduit piece 4 has a conduit closure 5. The conduit closure 5 is fashioned in the form of a sliding blade 51, which in the open position is mounted in a sliding blade housing 49. For the sliding blade 51, a guide 48 is arranged between the conduit upper part 41 and the conduit lower part 42 by means of a sliding handle 50, the sliding blade 51 can be moved from the sliding blade housing 49 along the guide 48 to the closing position SS. The sliding blade 51 is sealed by two O-rings 53 on the conduit upper part 41 and the conduit lower part 42. At one end 57 of the sliding blade housing 49 there is provided another seal 58, to secure the sliding blade housing 49 against the escape of liquids and solids.

The waste-holding tank 15 has at its top side an inlet opening 20 for receiving of waste water with or without solids 19. The inlet opening 20 of the waste-holding tank 15 can be closed by a horizontally movable inlet cover 21. A seal 22 is provided at the inlet opening 20, having two inwardly and outwardly projecting curved sealing lips 23, 24. Thanks to the seal 22, the inlet opening 20 is closed liquid and odor tight when the inlet cover 21 is in place. The closed position of the inlet cover 21, hereinafter also called the sliding lock, is automatically reached by the cover dog 65 on the inlet cover 21 when the waste-holding tank is taken out. The functioning of the dog is assured by the holding segment 66 of the dog 65 in combination with the locking lug 67 of the inlet cover 21.

Thus, the toilet 1 provides a so-called double closure, consisting of the conduit closure 5 and the inlet cover 21. Thanks to a locking mechanism 71 which can be coupled to the conduit closure 5 and the waste-holding tank 15, the conduit closure 5 can be locked, so that the sliding blade 51 cannot move in the locked state. For example, the conduit closure cannot be opened if the cassette is not in the inserted state EZ. As a result, in the extracted state AZ the closed position SS of the conduit closure 5 automatically occurs. The locking mechanism 71 between the sliding blade 51 and the waste-holding tank 15 in FIG. 3 is schematically indicated by a dot and dash line rectangle in FIG. 2.

The locking mechanism 71, not otherwise depicted, comprises for example a cassette dog which can be coupled to the waste-holding tank 15 via a coupling element and a closure dog which can be coupled to the conduit closure 5. The two dogs are mounted displaceably in the carrier part 6 and the upper part 2 of the toilet, respectively.

Figure 4:
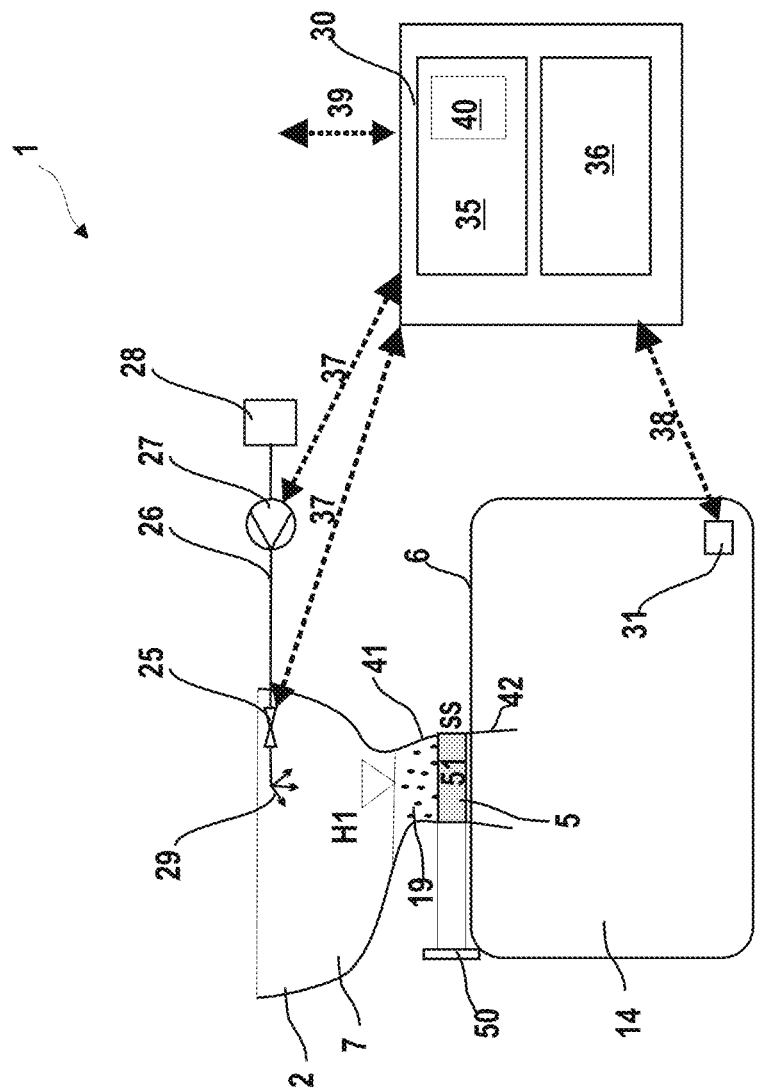
FIG. 4, a schematic cross sectional view of another embodiment of the toilet with a programmable control unit after actuating an emergency flush.
Figure 5:
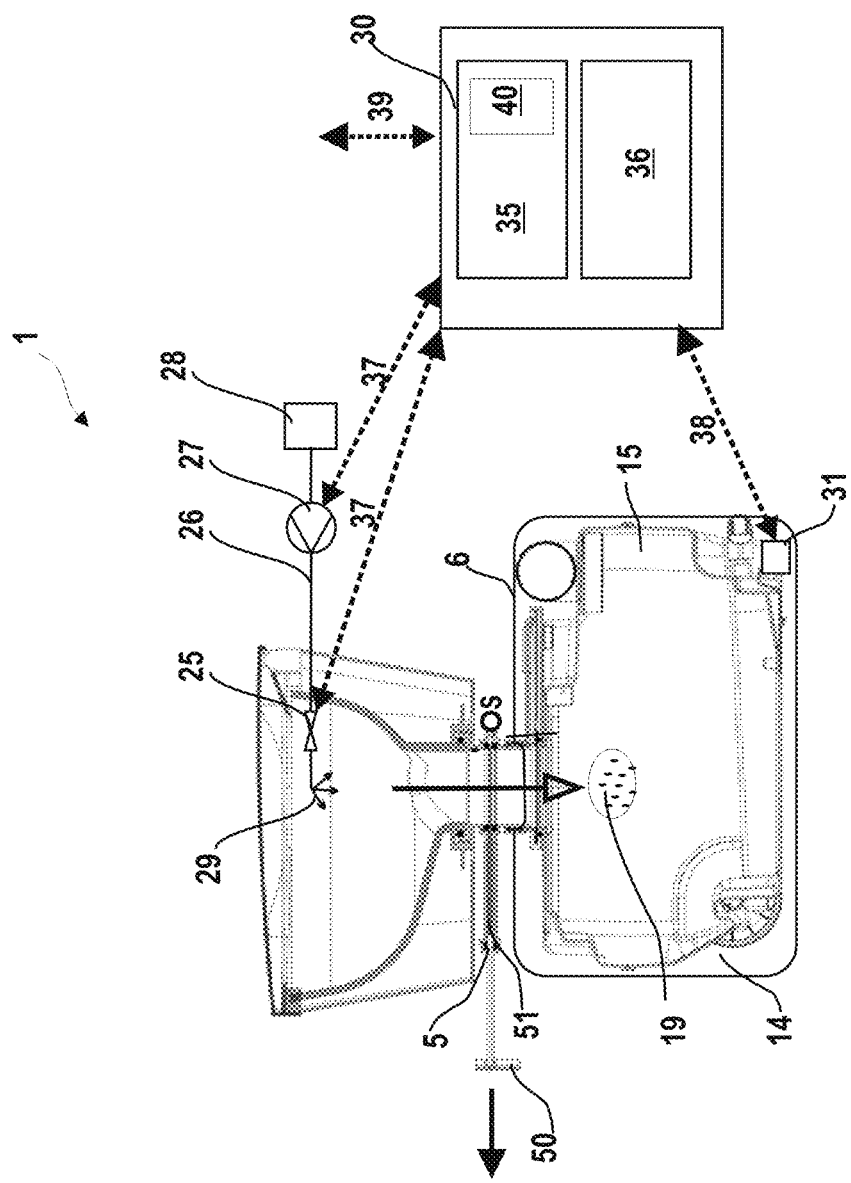
FIG. 5, a toilet per FIG. 4 with waste-holding tank inserted upon opening of the conduit closure.

The necessary mechanical and electronic components for a programmable flushing operation of a toilet 1 are shown schematically in FIGS. 4 and 5. The supply of flushing liquid comes via a suitable flush nozzle 29 in the upper region of the toilet bowl 7. The flush nozzle 29 is supplied with flushing liquid from a supply unit 28 via a line 26. The supply unit 28 can be configured as a flushing liquid tank or a central water supply to which the toilet flushing is connected. For better odor abatement, chemical additives can be added in the supply unit 28. From the supply unit 28, the flushing liquid is delivered via the pump 27 to the flushing valve 25. The supply of liquid to the toilet bowl 7 can be regulated in terms of the opening time of the flushing valve 25, which is configured as a magnetic valve for example.

The waste water 19 produced by a use of the toilet and a flushing, with or without solids, is taken up by the conduit closure 5, provided it is in the closed position SS as indicated in FIG. 4.

The actuating of the flushing units occurs via the control unit 30. The control unit 30 in the sample embodiment is designed as control electronics. The control unit 30 comprises an operator panel 36 and an onboard computer 35 with storage unit 40. The storage unit 40 can obtain control programs via the external interface, shown by the double arrow 39. Through this interface 39, every kind of program can be transmitted to the electronics and to the software of the onboard computer 35 and thus the emergency flushing function of the inventive embodiments can be programmed.

A programmed emergency flushing, which is contained in the storage unit 40, lets the toilet be flushed once again when a flushing is actuated. This emergency flushing is also performed when the waste-holding tank has been removed (AZ, see FIG. 4). The actuating of the emergency flush function occurs via the communication interfaces 37 by actuating the pump 27 and the flush valve 25. The amount of flush water and thus the level of waste water in the toilet bowl 7 are regulated by a preset and programmed flushing liquid volume. The toilet flushing occurs only for a predetermined time, which is programmed on the control unit 30 and electronics. In the example depicted, a liquid height H1 results after the emergency flushing is done.

Thanks to the emergency flushing up to the level H1, solids especially fecal matter are covered with flush liquid for storage in the toilet bowl, so that fouling of the toilet bowl is prevented to the utmost and odors are minimized. Depending on individual usage requirements, the minimum flush water volume or the liquid level H1 to be reached is individually adapted. For this, different program functions adapted to the user or relative to the water supply are programmed in the storage unit 40 of the onboard computer 35. The actuating of an emergency flushing is done via an activating device, such as the operator panel 36.

Furthermore, the embodiment of FIG. 4 and FIG. 5 shows the providing of a sensor 31, which is designed as a position sensor. The sensor 31 detects whether the waste-holding tank 15 has been inserted in the cassette shaft 14. Based on this signal, an emergency flushing can be actuated. For the data transmission from sensor 31 to control unit 30, the control unit 30 has an interface 38. In the inserted state of the waste-holding tank, a corresponding signal "EZ" is sent via the communication interface 38 to the control electronics. This communication can be wireless or wireline. If the sensor detects no waste-holding tank as in FIG. 4, the closed position SS of the conduit closure can also be provided automatically by a mechanical coupling. An emergency flushing can then be actuated by the interfaces 37.

The representation of FIG. 5 differs from that of FIG. 4 only in that the positions of the waste-holding tank and the conduit closure have been changed. FIG. 5 shows the inserted state EZ of an empty waste-holding tank 15. The waste-holding tank 15 is inserted into the cassette shaft such that the inlet opening 20 is situated beneath the conduit piece and the inlet cover 21 of the waste-holding tank 15 is displaced by the dog 65 into the open position. Thereupon the conduit closure 5 still closed in FIG. 4 is unlocked and can be moved into the open position OS by pulling out the sliding blade 51 at the handle 50. After opening the conduit closure 5, the emergency flushing liquid together with the solids and waste water 19 goes to the waste-holding tank 15 (shown schematically in FIG. 5 with the downward pointing arrow). After this, an additional flushing can be actuated by means of the control unit 30 for a better flushing effect.

Figure 6:
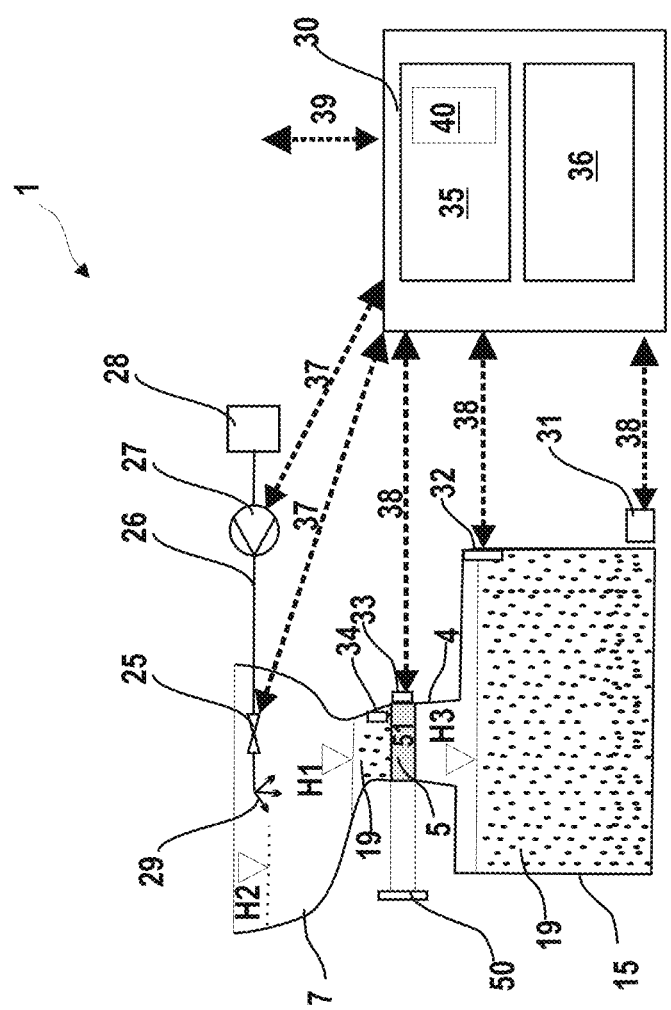
FIG. 6, a schematic cross sectional view of another embodiment of the toilet with sensors; and, FIG. 7, a flow chart of a method for emergency flushing of a toilet according to the embodiments.

Another embodiment of the toilet 1 of the embodiments is shown in FIG. 6. In addition to the components shown in FIG. 5, additional sensors 32 to 34 are provided for measuring the state variables. A fill level sensor 32 is located in the cassette or the waste-holding tank 15, being designed as a radar sensor or the like. If the waste-holding tank has reached the maximum fill level H3, this state is relayed via the interface 38 to the control unit 30. The control unit 30 is programmed such that it allows one last emergency flush, which can be stored above the closed conduit closure 5. In this way, an overflowing of the waste-holding tank 15 is prevented and when the waste-holding tank 15 is pulled out no waste water 19 gets into the cassette shaft 14 or the vehicle in uncontrolled manner.

In order to ensure that the conduit closure 5 has in fact been closed manually or automatically, a sensor 33 is also provided to detect the position of the conduit closure. If the states "maximum fill level H3" and conduit closure closed, i.e., in "closed position SS", are fulfilled at the same time, the emergency flushing is enabled by the control unit 30. The enabled emergency flushing is actuated by a user when needed by the activating device, such as an operator panel 36. The actuated emergency flushing is carried out by actuating the pump 27 and the corresponding valve 25.

Optionally, a further sensor 34 can be provided in the lower region of the toilet bowl, which can indirectly detect the use of the toilet. The sensor 34 serves to detect changes in the temperature, the pH value, or the like after going to the toilet.

In order to prevent an improper use of the toilet by the user, a maximum amount of liquid is predefined in the control electronics. In FIG. 6, the maximum permissible flushing liquid level is shown as H2. This maximum level of flushing liquid is ensured by an auto stop function, which limits the maximum opening time of the flush valve 25. In this way, a fouling of the flush nozzle 29 and an overflowing of the toilet bowl 7 is prevented.

Figure 7:
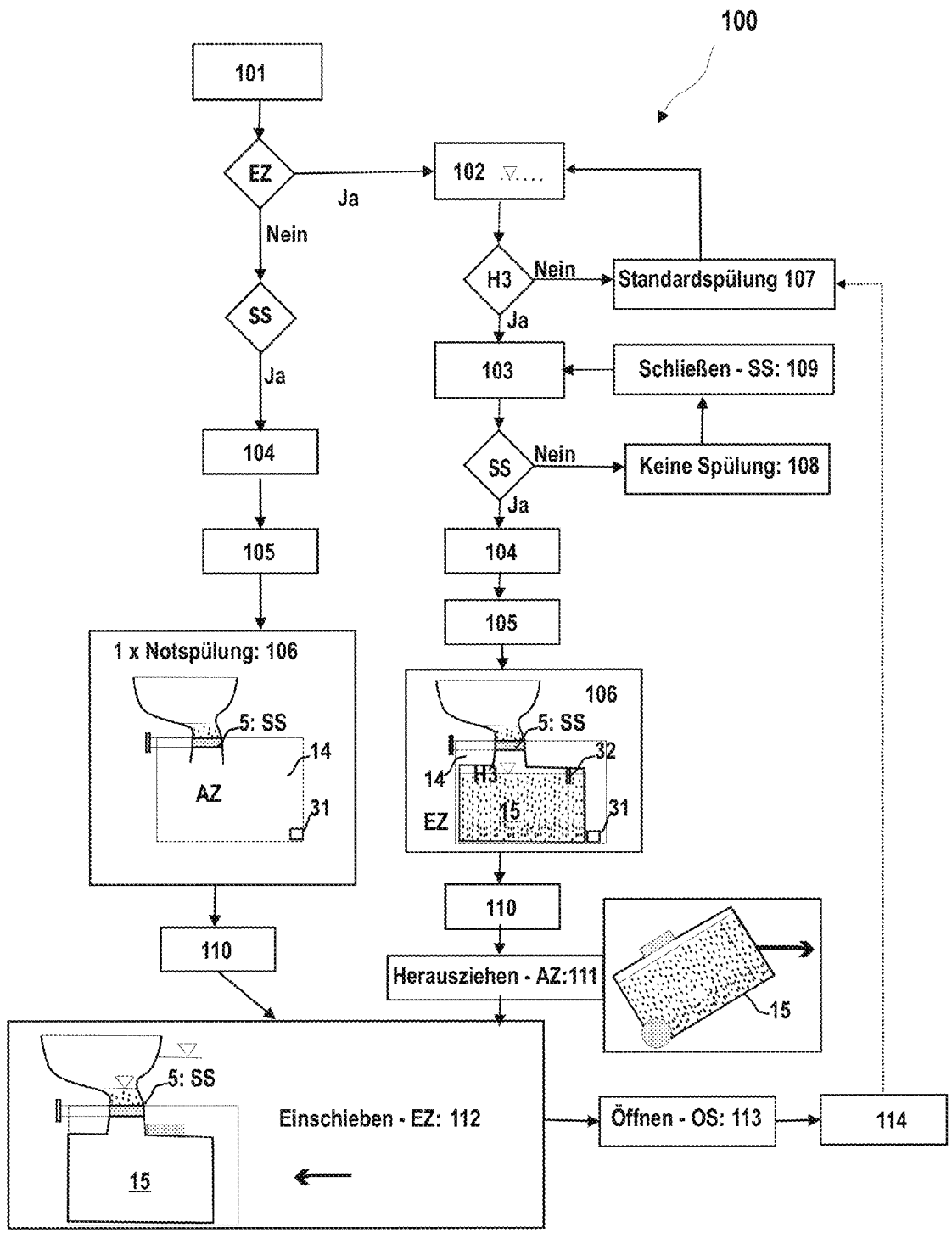

The flow chart in FIG. 7 shows schematically the steps of the invented method 100. The first step 101 involves the detecting of a state variable, especially the waste-holding tank position. However, this chosen start and the sequence of steps shown is not absolutely necessary. Instead, the starting can occur at any individual step, depending on the starting state of the toilet.

According to the method of the inventive embodiments for operating a toilet 1, in a first step the position of the waste-holding tank is detected 101 by means of a suitable sensor 31. In the next step, the control unit 30 polls whether the inserted state EZ is present. If the waste-holding tank 15 has been removed, the signal "waste-holding tank not in inserted state" is sent to the control unit 30. Given a mechanical coupling of the waste-holding tank 15 to the conduit closure 5, the extracted state is automatically connected with the closed position SS of the conduit closure 5. Thus, as the next step 104, an emergency flushing can be enabled. After this comes step 105, which contains an actuating of a flushing. This can occur either directly by the user with an activating device or indirectly by another sensor detection.

After the actuating, a onetime emergency flushing is carried out in step 106. In this way, excrement or liquids can be kept hygienically in the toilet bowl 7 and fouling can be avoided. To prevent an overflow of the toilet bowl 7, the flushing is deactivated in the next step 110. As the next step 111, an empty and cleaned waste-holding tank 15 can be inserted once again, so that the inserted state EZ is achieved. After this, in step 112, the conduit closure 5 is opened and moved to the open position OS, so that the waste water can be drained into the waste-holding tank 15 as usual.

In order to drain away the waste water temporarily stored for the emergency flushing in a better and cleaner manner, a standard flush is automatically performed after the opening 113 of the conduit closure 5 in step 114, i.e., without manual actuation by the user. In this way, possible contamination can be removed more effectively. After this, the toilet 1 can be used in normal operation as customary. For this, standard flushes 107 are actuated by a user as needed until a maximum fill level H3 is reached.

The fill level is detected in step 102 of FIG. 7 in the inserted state EZ of the waste-holding tank 15. The measurement result of the fill level sensor 32 is sent to the control unit 30 for evaluation. If the maximum fill level H3 is not yet reached, a standard flushing 107 is enabled.

Upon detecting the maximum fill level H3, in step 103 a sensor 33 checks whether the closed position SS of the conduit closure 5 is present or not. If the closed position SS is not confirmed, no flushing is enabled (step 108), in order to prevent an overflow of the waste-holding tank 15.

In step 109, the conduit closure 5 is closed and preferably fixed in this position to prevent an unintentional opening. A repeated detecting of the closed position SS in step 103 thereupon produces a positive polling result in regard to the closed position SS. After this, in step 104, the emergency flushing is enabled by means of the control unit 30. This can be actuated by a user or indirectly by the use of the toilet bowl 7 or the toilet 1 (step 105). Finally, even though the waste-holding tank 15 is full, a onetime emergency flushing can be done in step 106. To prevent an overflowing of the toilet bowl 7, a further emergency flushing 106 and all other flushing functions are deactivated in step 110.

When the recreational vehicle or water craft afterwards reaches a disposal station, the waste-holding tank 15 can be pulled out and the extracted state AZ is achieved. After emptying or replacing the waste-holding tank 15 with a cleaned and/or empty waste-holding tank 15, it can again be inserted in step 111. After opening the conduit closure 5 in step 112, the temporarily stored emergency flush with possible solids drops into the waste-holding tank 15. As in the preceding sequence of steps, the emergency flushing after opening 103 of the conduit closure can be automatically supported by a standard flushing in step 114.

The foregoing description of several methods and an embodiment has been presented for purposes of illustration. It is not intended to be exhaustive or to limit the inventive embodiments to the precise steps and/or forms disclosed, and obviously many modifications and variations are possible in light of the above teaching. It is intended that the scope of the present embodiments and all equivalents be defined by the claims appended hereto.

LIST OF REFERENCE NUMBERS

1 toilet
2 upper part
3 lower part
4 conduit piece
5 conduit closure
6 carrier part
7 toilet bowl
8 toilet seat
9 toilet lid
10 housing
11 toilet bowl outlet
12 thread
13 O-ring
14 cassette shaft
15 waste-holding tank
16 wheel
17 handle
18 disposal nozzle
19 waste water with solids
20 inlet opening
21 inlet cover
22 cassette seal
23 sealing lip
24 sealing lip
29 flush nozzle
30 control unit
41 upper conduit part
42 lower conduit part 48 guide
49 sliding blade housing
50 sliding handle
51 sliding blade
53 O-ring
57 free end of the sliding blade housing
58 seal
60 cassette adapter
61 foot part
64 flange
65 dog
66 holding segment
67 locking lug
69 cover guide
70 edge web
71 locking mechanism
EZ inserted state
AZ extracted state
SS closing position
OS open position

The invention claimed is:

1. A method for flushing a toilet for vehicles, a toilet of a recreational vehicle, with a toilet bowl, a control unit for actuating a flushing with a control program, and a conduit piece for conveying the waste water out from the toilet bowl into a waste-holding tank, comprising the steps of:
   closing of the conduit piece by a conduit closure;
   providing an emergency flush function by the control program; and,
   performing of an emergency flush when a flush is triggered;
   polling of at least one status variable in regard to the waste-holding tank and the conduit closure;
   providing of the emergency flush function by the control program in dependence on the at least one status variable; and,
   performing of the emergency flush, a standard flush, or no flush in dependence on the at least one status variable;
   detecting of the status variable of waste-holding tank position (EZ/AZ) by means of a sensor;
   processing of the status variable of waste-holding tank position (EZ/AZ) by the control unit; and,
   releasing of an emergency flushing in dependence on the status variable of waste-holding tank position (EZ/AZ).

2. The method according to claim 1, further comprising the step:
   automatic halting of the emergency flush by a timer control.

3. The method according to claim 1, further comprising the step:
   deactivating of the flushing after performing the emergency flush.

4. The method according to claim 1, wherein the closing of the conduit closure is required for the removal of the waste-holding tank.

5. The method according to claim 1 wherein said at least one status variable is one of a position of the waste-holding tank and the conduit closure.

6. The method according to claim 1, further comprising the steps of:
   detecting of the status variable of fill level in the waste-holding tank by a sensor;
   processing of the status variable of fill level in the waste-holding tank by the control unit; and,
   releasing of an emergency flushing in dependence on the status variable of fill level in the waste-holding tank.

7. The method according to claim 1, further comprising the steps of:
   detecting of the status variable of conduit closure position by a sensor;
   processing of the status variable of conduit closure position by the control unit; and,
   releasing of an emergency flushing in dependence on the status variable of conduit closure position.

8. The method according to claim 1, wherein the actuating of the flushing is done by a user via an activating device.

9. The method according to claim 1, wherein the actuation of the emergency flushing is done with sensor support via the direct and/or indirect detection of a user by a sensor.

10. A method for flushing a toilet for vehicles, a toilet of a recreational vehicle, with a toilet bowl, a control unit for actuating a flushing with a control program, and a conduit piece for conveying the waste water out from the toilet bowl into a waste-holding tank, comprising the steps of:
    closing of the conduit piece by a conduit closure;
    providing an emergency flush function by the control program;
    performing of an emergency flush when a flush is triggered;
    inserting of the waste-holding tank after performing the emergency flush;
    opening of the conduit closure and releasing of the waste water into the waste-holding tank; and,
    performing of a standard flush.

* * * * *